United States Patent [19]
Grochowski

[11] Patent Number: 5,766,555
[45] Date of Patent: Jun. 16, 1998

[54] FEED INLET FLOOR FOR MOBILE BED REACTORS

[76] Inventor: Horst Grochowski, Hafenstrasse 25, 4200 Oberhausen 12, Germany

[21] Appl. No.: 409,889

[22] Filed: Mar. 21, 1995

Related U.S. Application Data

[63] Continuation of Ser. No. 445,713, Mar. 24, 1993, abandoned.

[30] Foreign Application Priority Data

May 7, 1987 [DE] Germany ............... 87 06 539.8
Sep. 26, 1987 [DE] Germany ............... 37 32 567.1

[51] Int. Cl.⁶ ...................................... B01J 8/12
[52] U.S. Cl. ............... 422/129; 422/213; 422/232
[58] Field of Search ................... 422/129, 213, 422/232

[56] References Cited

U.S. PATENT DOCUMENTS 2,656,007  10/1953  Arnold et al. ............... 422/207

FOREIGN PATENT DOCUMENTS

883598   3/1954   Germany.
914125   6/1954   Germany.
3232544  6/1983   Germany.
2116869  10/1983  United Kingdom.

Primary Examiner—Timothy McMahon
Attorney, Agent, or Firm—Tarolli, Sundheim, Covell, Tummino & Szabo

[57]  ABSTRACT

To achieve better distribution of the fluid and optimal flow of bulk products, the feed inlet floor of a mobile bed reactor comprises parallel cellular bulk feed hoppers (9A) covering the surfaces or funnel shaped bulk discharge chutes (9B), the side walls (14A and 14B) of which are provided with openings (16A and 16B) for the passage of feed fluid above which roof-shaped feed distribution elements (18A; 18B; 18C) opening downward are arranged on the inner surface of the hoppers or chutes so as to project from the said surface. For flat, parallel flow of the bulk product, it is particularly advantageous that the distribution elements are arranged so that they also lie, in the direction of flow of the product, above the outlet openings (26A and 26B) for the latter in the hoppers or chutes and therefore preferably cover the entire surface region of the opening in the form of a roof. This type of feed inlet floor is advantageously used, amongst others, by adding to the intake fluid in the region of the said floor, another fluid component, for fluid treatment purposes, which then initiates a desired reaction in the region of fluid treatment and/or by extracting the bulk product from the reactor in cycles and in quantities corresponding to the contaminated layer of the product in the region of fluid treatment, and/or by using as intake fluid a gas or gaseous mixture the dew point of which is not attained at least in the lower horizontal region of fluid treatment. This non-attainment of the dew point is judiciously achieved by means of the feed inlet floor and makes it possible to carry out the fluid treatment in two phases, namely a first wet phase and a second dry phase.

23 Claims, 5 Drawing Sheets

FEED INLET FLOOR FOR MOBILE BED REACTORS

This is a continuation of application(s) Ser. No. 07/445,713 filed on May 5, 1988 now abandoned.

TECHNICAL FIELD

The invention relates to a feed inlet floor for moving bed reactors, as well as a process for operating these devices.

BACKGROUND ART

Moving bed reactors are used for treating fluids on more or less finely divided loose material. The loose material forms a loose material bed moving downward from above through the reactors, and is drawn into the reactor above and drawn out continuously, or almost continuously, below. In the zone of discharge of loose material from the treating region, a so-called feed inlet floor is arranged which has, on the one hand, outlet openings for the loose material and, on the other hand, entrance openings for the fluid to be treated.

One purpose in such moving bed reactors is to assure as uniform as possible a treatment of the fluid. This purpose is attained, on the one hand, by especially uniform flow conditions of the fluid and, on the other hand, by as uniform conditions as possible of the loose material. In moving bed reactors operating in opposite flow, a plane-parallel drawing off of all the particles of loose material is especially difficult, above all, when the fluid is such that it can obstruct, partly or even wholly, the feed inlet floor.

From German DE-C-883 598 is known a feed inlet floor for moving bed reactors, which consists of funnel-shaped loose material drain channels arranged parallel with each other, while in the side walls of the funnel are made in Venetian blind form. The Venetian blind slits serve as passage openings for the feed inlet fluid which extend along the channels. Roof-shaped distributor elements may be used either for the distribution of feed fluid or only for the drainage of the loose material, while the passage of the gas-type agent takes place through the floor separate from that of the adsorption agent. In this known feed inlet floor, the distributor elements are arranged above the outlet opening on the bottom of the funnel-shaped channel.

From German Publ. Appln. 3,232,544 is known a process for removing sulfur and nitrogen oxides from an exhaust gas by a dry treatment passing the exhaust gas through a moving bed formed of an adsorption agent containing carbon, and removing the nitrogen oxide by the reducing action of ammonia at the same time with the sulfur oxide, while the ammonia is fed directly to the moving bed consisting of an adsorption agent containing carbon.

SUMMARY OF THE INVENTION

Starting from the above state of the art, the invention addresses the problem of assuring an improved fluid distribution with the best possible, especially plane-parallel, drawing off behavior of the loose material, and an especially advantageous process for the operation of the device. Accordingly, an optimized distribution of fluid, as well as an optimized withdrawal behavior of solids, is desired.

According to the invention, therefore, the entrance of feed fluid into the treating region is free of built-up loose material surfaces, which results directly after those points at which the loose material comes out of the treating region.

The first loose material drain funnels are advantageously also arranged one after the other, especially in honeycomb form, and preferably covering the surface. In the case of first funnel-shaped loose material drain channels, preferably several such first funnel-shaped loose material drain channels are arranged parallel with each other.

According to the invention, the arrangement of the distributor elements is so chosen that the distributor elements begin on the inside of the funnel or channel side walls, and stand out toward the inside of the funnel or channel, while several distributor elements are arranged distributed along the funnel or channel wall. By the fact that the roof-shaped distributor elements are arranged above the passage openings for the fluid provided in the funnel or channel side walls, the fluid enters at a point in the layer of loose material at which a surface free of loose material forming a depression exists. This is because of the roof-shaped distributor elements arranged above the passage openings. These depressions begin at the side walls and extend to the inside of the funnel or channel. In the alternative embodiment, the distributor elements are (also) arranged above the loose material outlet openings.

It has been found that the arrangement according to the present invention, despite relatively great screen measurements of the feed inlet floor, assures an extraordinarily uniform distribution of fluid over the whole cross-section of the container. In particular, caking, sticking, or similar deposits of the layer of loose material in the zone of the fluid passage openings is avoided. Precisely, this problem in the known moving bed reactors with a Venetian blind type feed fluid surface is only very unsatisfactorily solved. Since sticking or similar disturbances of the loose material layer in the zone of the fluid passage openings are prevented by this solution also, the withdrawal behavior of the loose material is improved.

Through the alternative solution according to the present invention, it is attained among other things that the loose material particles can be drawn off substantially plane-parallel without thereby having to tolerate too great a construction height of the feed inlet floor or other costly construction. Through the possibility of plane-parallel withdrawal of loose material, according to the present invention, the uniformity of fluid distribution is also favored, since all the horizontal layers of loose material particles lying one above the other are uniform, and special nests of special contamination or even sticking can be avoided.

The feed inlet floor according to the invention has, among others, the advantage that a relatively great free on-flow surface can be obtained. Also, the fluid is distributed extremely evenly over the cross-section of the moving bed reactor, and the so-called "core flow" of the loose material at the loose material exit is suppressed. Moreover, the loose material may have an extremely small particle diameter as compared with the mesh size of the feed inlet floor.

When for simplicity only "funnels" are mentioned below, these are understood to include channels funnel-shaped in cross-section.

The roof-shaped distribution elements opening downward distribute, as mentioned above, the feed fluid flowing in through the passage openings in the side walls of the loose material drain funnels into the inner space of the funnels (namely, the fluid to be treated) onto a relatively great feed cross-section compared to the cross-section of the passage opening (free on-flow surface), namely the loose material surface naturally formed below the distribution element. The fluid flow speed below the feed inlet floor, for example, in the so-called "wind box" of the may therefore be locally relatively great without the uniformity of feed fluid in the treating region of the moving bed reactor being adversely affected thereby. Through the arrangement according to the invention, it is possible to separate out any particles and/or mix components carried along with the feed fluid, and to disturb the treatment from the feed fluid by deposition on the loose material particles exactly at the point at which the feed fluid comes into the treating region and the loose material comes out of the treating region. The loose material present in the treating region is therefore not contaminated by such "impurities", and the fluid flow conditions in the treating region can no longer be made uneven by dirt-laden loose material particles, as the case was in the moving bed reactors known up to now. Moreover, so-called "hot spots" in the moving layer of loose material are also suppressed. If an equal number of loose material feed pipes or shafts and loose material outlet discharges (between the first loose material drain funnels and the distribution elements) are provided and arranged displaced from each other, as this is known from WO 87/00768, it is also possible with suitably small heights of bed to work and to obtain relatively large reactor cross-sections without having to tolerate undesirable side effects.

Through the arrangement according to the invention, a modular structure of the feed inlet floor is made possible if each module consists of a ready-made loose material drain funnel which can be handled by one person and can be suspended in a grid-shaped bearing frame in the bottom portion of a moving bed reactor. In principle, the cross-sectional shape of the funnel may be freely selected. Funnel cross-sections are preferred, however, that assure a surface-covering arrangement over the whole cross-section of the reactor. Thus, for example, the loose material drain funnels may have the cross-section of an equilateral triangle, or a hexagon, or a rectangle, preferably a square.

According to the invention, loose material drain funnels are preferably made of sheet metal or also of plastic, while connections especially at seam points may be made by welding. The loose material drain funnels may be either suspended loose in the honeycomb bearing frame, or screwed or welded to the latter. In any case, it is recommended that on the outer walls of the funnels, support pieces, preferably angular, be provided in displaced arrangement.

The number of the circumferentially divided passage openings on the loose material drain funnels, and their cross-section as well as their height distribution may be freely selected. In loose material drain funnels polygonal in cross-section, at least one passage opening should be provided on each funnel side wall surface, all the passage openings of a loose material drain funnel being preferably arranged at the same height level and, in particular, having the same cross-sectional shape and size. It is recommended that the passage openings be chosen as large as possible, that is, as large as permitted by the contact line of the distributor element against the side walls of the funnels.

The distributor element, at least in the zone of the adjoining edges of the "roof surfaces", are tightly joined with the funnel side walls, for example, by continuous welding seams. The distributor elements then project into the inner space of the funnels, while their "roof ridges" preferably point toward the middle of the funnel. According to one preferred embodiment of the invention, the distributor elements of the (first) loose material drain funnel are connected with each other at their free ends, that is, their ends away from the side walls of the funnel. The connection zone is preferably arranged above the loose material discharge outlet of the loose material drain funnel. In this way, on the one hand, the mechanical stability of the loose material drain funnel, and also the connection between its side walls and the distributor elements are noticeably increased, despite less thickness of material. Through the arrangement of the connection zone above the loose material discharge outlet, moreover, the danger of a core flow of the loose material in the loose material outlet zone of the treating region of the moving bed reactor is completely eliminated. In the case of a channel-shaped design of the feed inlet floor, there is used for this purpose above all a roof-shaped distributor element which extends above and parallel with the loose material discharge outlet of the loose material drain channel.

The above-mentioned measures suppressing core flow, especially in connection with the other features of the invention, may be applied with particular advantage when the passage openings below the distributor elements in the funnel walls are lacking, and the distributor elements consequently distribute the loose material only on several partial funnels or funnel-shaped partial channels of the feed inlet floor.

Accordingly, as an alternative solution, especially for obtaining an approximately plane-parallel drainage of loose material, a feed inlet floor for moving bed reactors with a freely selectable distribution device for the feed fluid, especially with a freely selectable arrangement of passage openings or entrance edges for feed fluid, according to claim 4, is proposed. In this alternative embodiment of the invention, preferably, (first) roof shaped distributor elements stand out from the side walls of the loose material drain funnels or channels toward the inside of the funnels or channels, so that adjoining distribution elements form partial funnels together with the loose material drain funnels or channels. Also, with this embodiment, it is preferable if the feed fluid enters into the layer of loose material only in the zone of the lower edge of the distribution element and/or the lower edge of the loose material drain funnels or channels.

If the loose material is coarse-grained enough, it may be advantageous, even in those zones of the side walls of the loose material drain funnels or channels which are in contact with the loose material, to provide passage openings for the feed fluid. But in an especially great number of cases of application, such additionally provided passage openings will usually be avoided, or at least so designed or covered that loose material cannot get in. Such covered or specially formed passages therefore cause an undesirable extra expense, which may however be necessary if, as very often, the loose material has also particles with grain dimensions varying from the desired size. Just by mechanical loading in transport and in movement of the loose material particles, a more or less great number of particles break into pieces of all sizes. Therefore, feed fluid passages in the funnel walls are very easily stopped up. This is not the case with the flowed-around lower part of the roof-shaped distribution elements and the funnels or channels. Therefore, the funnel or channel base size, that is, the funnel or channel width in the loose material entrance zone of the feed inlet floor, or the mutual distance of neighboring funnels or channels may be extremely great in comparison to the grain size of the loose material. In this way, extremely large-surface feed inlet floors may be relatively economical and stable, as well as relatively light weight to produce. Typical grid base measurements of funnel or channel grids are 100 to 2.000 millimeters. Grid base measurements between 300 and 800 millimeters are preferred. These are relatively large compared with the known feed inlet floors.

The loose material drain funnels according to the invention may be built into the moving bed reactor so that their loose material outlet openings are conducted through a second floor beneath the feed inlet floor, and namely with or without tubular extension pieces. The feed inlet floor and the second floor lying beneath then form, together with the reactor wall, a distributor box for the feed fluid which is led into this space. With this embodiment, the feed fluid can enter exclusively through the passage openings according to the invention in the side walls of the loose material drain funnels into the moving layer. Preferably, the loose material drain opening of the first loose material drain funnel, according to the invention is so arranged or formed that feed fluid can enter into the moving layer through these openings also. This is preferably obtained by the fact that beneath each first loose material drain funnel is arranged at least one second loose material drain funnel, with formation of a fluid passage gap and/or fluid passing walls. In this way, the rim portion of the loose material outlet opening from the first loose material drain funnel is flowed around by the feed fluid. Similar flow conditions are formed in the zone of those edges of the distributor elements according to the invention which are formed of "roof surfaces" with open underside (roof edges).

In the case of relatively fine-grained loose material (moving bed material) and/or relatively great moving bed height, that is, with favorable flow properties, the loose material surfaces forming in the loose material drain zone beneath the distributor elements tend to rise gradually. To prevent in such cases the loose material from expanding into the fluid inflow openings, according to a further development of the invention, apron type elements of sheet metal, for example, are set vertically down at the gas out-flow edges of the distributor elements so that despite maximal passage openings cross-sections through the funnel side walls, the free on-flow cross-section in the feed inlet floor is not reduced by the above-mentioned "apron" devices. In the zone of the fluid passage gap between the first and second loose material drain funnels, the above-mentioned expanding of the loose material can be prevented by the fact that the mouth of the first loose material drain funnel is arranged lower than the entrance opening of the second loose material drain funnel. Thus, the first extends into the second loose material funnel. Another advantageous measure to prevent the "swelling" of the loose material in the zone of the open loose material surface in the feed inlet floor consists of providing loose material dividing walls below the distributor elements and arranging these vertically.

Especially with a channel-shaped arrangement of the feed inlet floor, according to a preferred embodiment of the invention, other roof-shaped distributor elements, especially of the kind mentioned above, may be provided which are arranged at an angle, preferably at right angles, to the rest of the distributor elements, and are connected with the latter for a further distribution of fluid. In this way among other things, the number and size of loose material drain outlets can be still better planned. Also, the on-flow speed of the fluid to be treated is reduced in this way in the first contact with the loose material because the surface zones onto which they flow directly are enlarged by the additional distributor elements. Also, in this way, the stability of the feed channel is increased and, as mentioned above, a core flow of the loose material is still better prevented.

So long as at least one second loose material drain funnel (or channel) is arranged below the first loose material drain funnel (or channel), the exchange of loose material in any fluid passage gap provided between the two "funnels" is prevented which would impair, in particular, its ability to flow, but also its treating effect. To assure in this zone a uniformly good exchange of loose materials, according to another development of the invention, loose material conduction surfaces are provided which are arranged within the cross-section of the loose material discharge outlet of the first loose material drain funnel relative to the direction of movement of the loose material. By means of these loose material conduction surfaces, a favored drainage of loose material in the zone of the fluid passage gap between the two loose material drain funnels can be effected. Firstly, the loose material conduction surface can form a gap widening downward with, in each case, a wall surface of the second loose material drain funnel to obtain a flatter slope than the funnel walls. Secondly, the loose material conduction surfaces, cumulatively or alternately, can be at least partly movable, that is, may be movable as a whole or have movable flaps. In this way, the loose material drainage may be varied from the center of the discharge outlet of the loose material drain funnel. In particular, they favor a stronger drainage of loose material in the zone of the fluid passage gap between the first and second funnels. Thirdly, (also cumulatively or alternately) a loose material and fluid passage gap may be provided between the loose material conduction surfaces and the edges of the mouth of the first loose material drain funnel. This passage gap promotes the movement of loose material directly next to the fluid passage gap between the first and second loose material drain funnels.

Accordingly to a further development of the invention, if at or within the distributor element(s) and/or at the loose material drain funnels, pipes or the like with feed openings for the impacting fluid to be treated with a treating medium are arranged, it is obtained in this way that the reaction of the treating medium with the fluid to be treated can begin only on contact of the fluid to be treated with the loose material. A further advantage of these pipes, which preferably form the edges of the distribution elements and/or the loose material drain funnels (at least partly), lies in their stiffening effect on the feed inlet floor.

If the roof angle of inclination of the distributor elements corresponds to the side wall slope angle of the side walls of the loose material drain funnels, an especially uniform flow of material in the loose material drainage is assured in this way. Although the funnel side walls may be formed concave, convex, or with several bends, side walls formed flat (in the direction of movement of loose material) are preferred. This applies also to the surfaces directed upward of the side surfaces of the distributor elements. The "roof ridges" formed by the distributor elements or the neighboring loose material drain funnels may be rounded for the protection of the loose material. Typical angles of inclination of the side walls and roof surfaces of the distributor elements lie, as a rule taking into account the so-called friction angle, between 12° and 45° based on the vertical.

As to a process for the operation of a feed inlet floor for a moving bed reactor according to the invention, it is proposed that with the use of such a moving bed reactor an adsorption means is used as loose material for adsorbing at least one fluid component from a carrying fluid, and a third fluid component is mixed with the mixture at the entrance of the fluid mixture under the roof-shaped distributor elements, or is reacted with at least one of the other components present in the fluid treating region.

The feed inlet floor according to the invention is especially suitable, as already mentioned above, for use in those processes in which the fluid to be treated because of an especially high dust load, or the like, or because of fluid components which (like dust) can lead to very strong contamination of the loose material in the bottom layer of the moving bed reactor directly below the feed inlet floor. An especially important example of this is that of smoke fumes, dust-laden and/or containing $NO_x$, and also $SO_x$, from the power plant firing units. If a reducing agent such as $NH_3$ is used on the loose material to remove $NO_x$, and the gas fumes entering the moving bed reactor still contains $SO_x$ also, ammonium sulfate and other ammonia-sulfur compounds are deposited, namely on first contact with the loose material which may be activated charcoal, for example. This may lead, especially with dust-laden power plant exhausts, to a gluing together of loose material particles in the immediate feed zone of the feed inlet floor which can lead both to the prevention of the removal of loose material and also through dust deposits and gluing to an undesirable increase of the pressure loss in discharge.

If now according to an alternative procedure of the invention with the use of such a moving reactor the loose material is drawn off in strokes, and the amount of loose material drawn off during each stroke corresponds to the amount of the contaminated bottom layer of the loose material, the bottom layer is prevented in this way from becoming too thick. On the other hand, only as much loose material is drawn off in each case as required by the above-mentioned contamination process concentrated on the bottom layer of loose material. This is advantageous above all when the stopped time of the loose material in the rest of the moving bed reactor is comparatively great based on the generally slight danger of contamination of the loose material on the feed inlet floor, so that a continual draining of loose material would mean an unnecessary and sometimes even hard to realize expense.

According to another alternative procedure of the invention, it is proposed that the feed fluid is a gas or gas mixture, and the moving bed reactor is so operated that the dew point of the gas or gas mixture, at least in the lower horizontal zone of the fluid treating region drops below or at least only occasionally reached. Such a manner of operation of a moving bed reactor was, of course, avoided in the past. Therefore, it was necessary in certain cases to carry out another processing step, for example, a wet washing process to heat up again or dry pretreat gas before it was conducted into the moving bed reactor. Falling below the dew point in the loose material layer of the moving bed reactor was prevented, especially when the treating process was an adsorption process. By condensate formation, the pores of the adsorption agent, for example an active coke (charcoal), leading to the adsorption locations are obstructed. Surprisingly, such condensate formation, with use of the feed inlet floor according to the invention, is even an advantage in some cases. In any case, gluing (sticking) or clogging of the loose material in the zone of the loose material discharge or the fluid entrances are prevented or, without special intervention, automatically dissolved in the further course of the process. It was also found that the gas treatment, especially in the adsorption process, is not hindered when the condensate occurs only in the lower zone of the loose material layer, that is, in the lower horizontal zone of the fluid treating region and thus, the gas on its way up through the layer of loose material arrives farther up on dry loose material. It has been found that below the dew point of the gas in the fluid treating region, the formation of condensate becomes most important in the very lowest region and decreases upward so long as the entire fluid treating region is not below the dew point. Falling below the dew point and condensate formation, according to the invention, even leads to a welcome rinsing effect on the surface of the loose material particles on which the condensate runs down. It is even possible to operate the moving bed reactor as a wet washer while the condensate formed in the fluid treating region serves as washing fluid. Then a special spinning through the fluid treating region can be advantageously omitted.

If in the upper horizontal zone of the fluid treating region the dew point is still not fallen below, the gas to be treated is subjected to a two-step cleaning, one wet and one dry, in which the gas in the lower horizontal zone is cleared first wet and then dry-cleaned in the upper horizontal zone. For example, halogens or halogen compounds, especially chlorine compounds, are present in the fume gas besides $SO_2$. The chlorine or chlorine compound is especially easy to adsorb on dry adsorption agents. But from these adsorption positions, the chlorine or chlorine compound must be driven off again from adsorbed $SO_2$. The $SO_2$ adsorption front, therefore, pushes along the chlorine adsorption front in the direction of the gas flow through the layer of adsorption agent so that the chlorine or chlorine compounds break through relatively early at the end of the layer of adsorption agent, that is, in flowing out. Gases are still contained. Now if the moving bed reactor is operated in the lower horizontal zone as a wet cleaner, and in the upper horizontal zone as a dry cleaner, the chlorine or chlorine compound, as a general rule, will no longer reach the zone of dry cleaning because in the wet cleaning zone it was already bound to the condensate and with the condensate was raised away downward out of the moving bed reactor.

Of course the adsorber may be run so that because of the natural edge conditions, a falling below of the dew point is established. A procedure with fluid-wet active coke may also be brought about by the fact that through a pipe with feed openings provided on or within the distribution element(s), according to claim 14 or 15, water vapor or a fluid may be directly atomized in.

Another advantage of falling below the dew point, according to the invention, lies in the fact that in the zone of falling below the dew point, fly dusts are formed, especially fine dusts and the heavy metals occurring in combination with them bound to the loose material grains in the manner of a "wet loose material filter". For this reason, the feed inlet floor according to the invention and the process according to the invention are suitable for this operation, which both alone and in combination with each other, can be used to advantage even for especially difficult problems such as fluid treatment after special trash-burning units.

The feed inlet floor, according to the invention, is therefore based on its special design and is better able than the known feed inlet floors to assure an even flow of loose material and a plane-parallel drainage of loose material even in processes which, up to now, could not be carried out in the moving bed reactor, especially a one-step moving bed reactor.

The above-mentioned parts to be used, according to the invention, are subject to no special, exceptional conditions as to their size, shaping, choice of material, and technical design, so that the criteria of choice known in the particular field of application can be used without limit.

BRIEF DESCRIPTION OF THE DRAWINGS

Other details, features and advantages of the subject of the invention are provided from the description which follows of the drawings, in which is represented a preferred feed inlet floor for moving bed reactors.

DESCRIPTION OF SPECIFIC PREFERRED EMBODIMENTS

Figure 1:
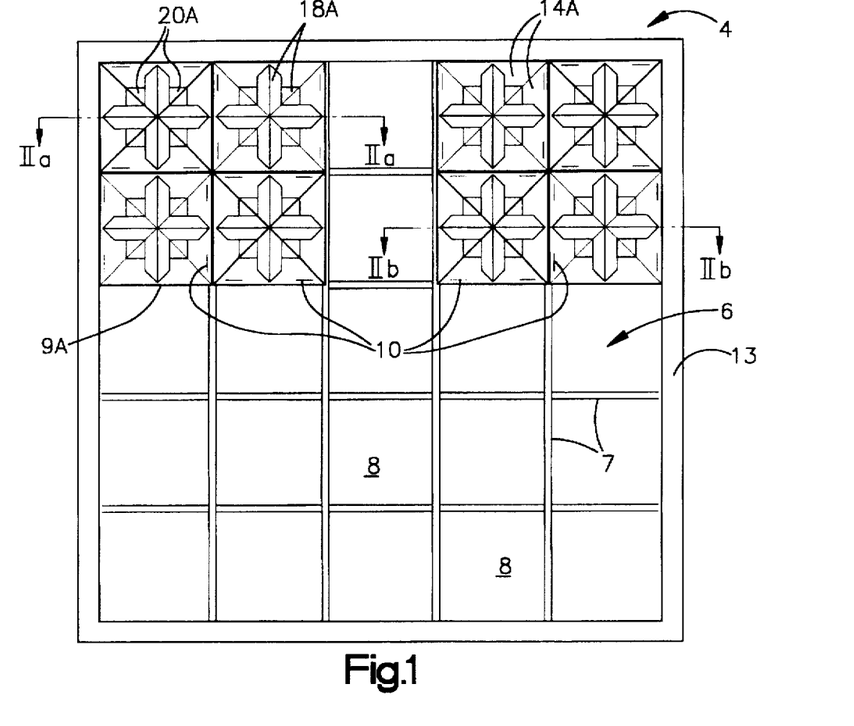
FIG. 1 shows a feed inlet bearing part of an unfilled moving bed reactor, with a feed inlet floor partly built in. (Section along line I—I in FIG. 2).

In FIGS. 1 and 2 is shown in diagram the installation of a feed inlet floor 1 according to the invention in a moving bed reactor 2. The moving bed reactor 2 has, in the example shown here, a square cross-section and has vertical walls in the portion of a fluid treating region 3, for example, metal plates. Below the feed inlet floor 1, the moving bed reactor 2 has a preferably funnel-shaped reactor bottom 4.

A feeding device for the loose material 5, active carbon for example, and for the drainage of feed inlet fluid (from the loose material to be treated or the fluid to be treated by the loose material itself) are not shown per se in the drawing since they are not the subject of the invention, and for the rest, are generally known. The fluid treating region 3 consists of a layer of loose material, preferably of constant height over the whole cross-section of the reactor.

Below the fluid treating region 3, the reactor is divided by a screen-shaped bearing grid 6 made of flat iron bars 7, for example, set together in grid form into feed fluid and loose material drain fields 8 of equal size covering the surface. Preferably, the bearing grid 6 is held by a bearing grid frame 15 against which the moving bed reactor is supported and the reactor side walls as well as their reinforcements can be fastened. The bearing grid frame with the bearing grid can be designed as a prefabricated construction element.

With the feed fluid and loose material drain fields 8 of equal size in base dimension, the first loose material drain funnels 9a are suspended in the bearing grid 6. For this are used support pieces 10 arranged on the loose material drain funnels 9A.

In the (first) loose material drain funnels 9A are suspended the (second) loose material drain funnels 11A by fastening straps 12 (FIG. 4) below.

The several loose material drain funnels 9A and 11A having in their edge lengths a maximum of 0.6 meter, for example, are constructed as follows.

Figure 3:
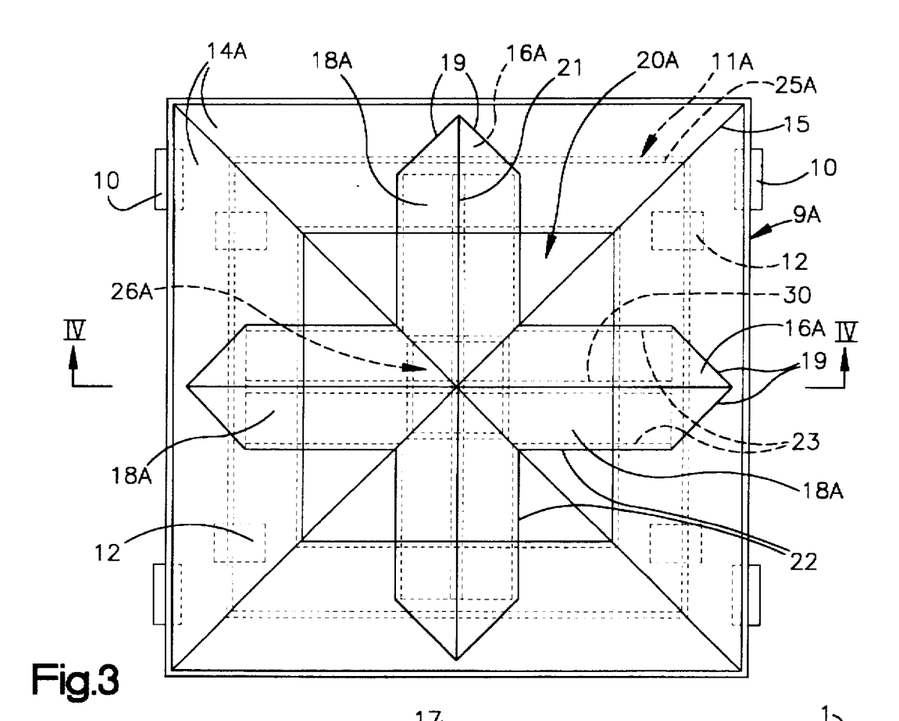
FIG. 3 shows a feed inlet floor module (loose material drain funnel) of the same moving bed reactor, in top view (View A in FIG. 2).
Figure 4:
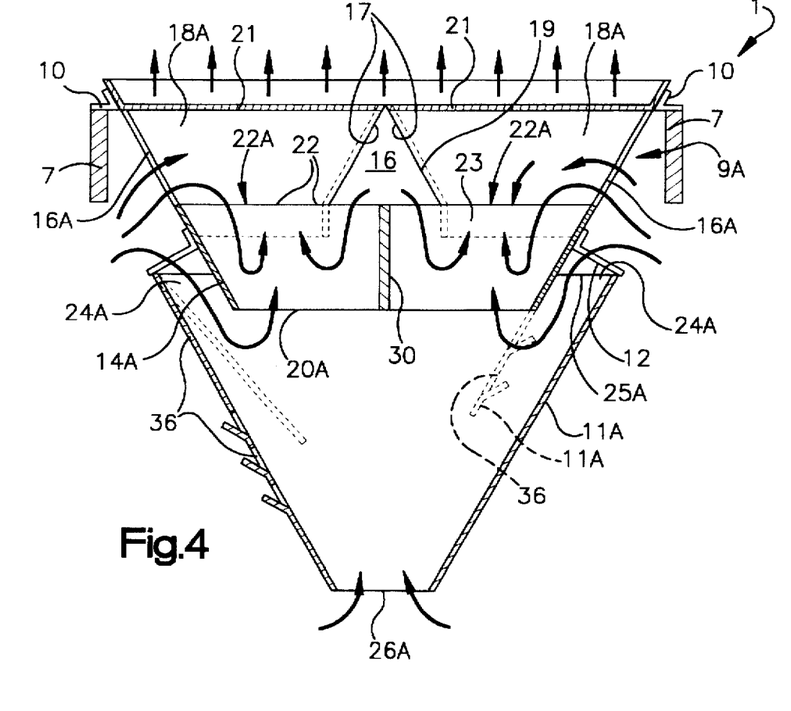
FIG. 4 shows a detailed vertical section representation of a feed inlet module of the same moving bed reactor, along the line IV—IV in FIG. 3.

According to FIGS. 3 and 4, the first loose material drain funnel 9A has, in each case, four level sidewalls of equal size consisting of sheet metal and are welded together on the edges 15. Each side wall 14A has in its center a triangular passage opening 16A for treating fluid. Two upper opening edges 17 of the passage openings 16A adjoin inside of the funnels under open roof-shaped distributor elements 18A so that they stand out from the side walls 14A to the inside of the funnel. The distributor elements 18A consist of a simple angled pieces of sheet metal, of which the angle of inclination (based on the vertical) correspond to the angle of inclination of the side walls 14A. The distributor elements 18A are, at their free ends away from the side walls 14A, joined with each other along contact edges 19 by welding seams. In this way, the connection zone of the distributor element 18A as well as the central arrangement of the passage openings 18A on the sidewalls 14A is in the zone above the loose material discharge openings 20A and 36A of the first and second loose material drain funnels 9A and 11A.

The ridges 21 of the roof-shaped distributor elements 18 form, therefore, a rectangular cross and are preferably arranged in a common plane.

Vertically arranged short aprons 23 of sheet metal which prevent an over-expansion of the loose material particles into the passage openings 16A adjoin at the lower edges 22 of the distributor elements 18A which form with the side walls 14A loose material passage openings 22A.

Below each first loose material drain funnel 9A is a second loose material drain funnel 11A, with formation of a fluid passage gap 24A arranged suspended by means of fastening straps 12. The inclination of the side walls, also four, of the second loose material drain funnel 11A is equal to the angle of inclination of the first loose material drain funnel 9A, for example, about 20°. However, it may be flatter, for example, by about 10° (based on the vertical). In order to keep the construction height of the funnel module as low as possible, and with practically no negative effect on the plane parallelity of the loose material drainage from the fluid treating zone, the latter is represented in the left half of FIG. 4, in broken line.

Figure 2A:
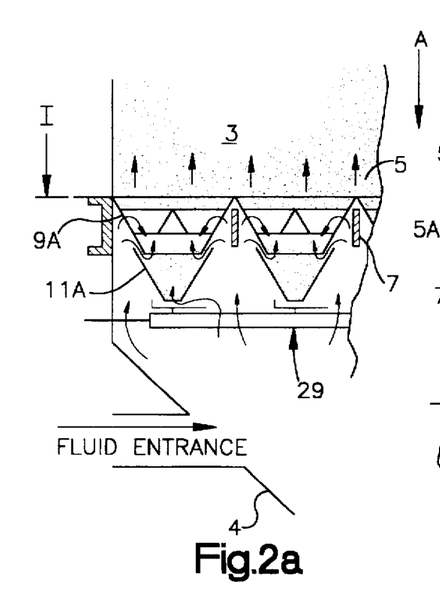
FIG. 2 shows two schematic vertical section representations of the same moving bed reactor. (Sections along lines IIa—IIa and IIb—IIb in FIG. 1).
Figure 2B:
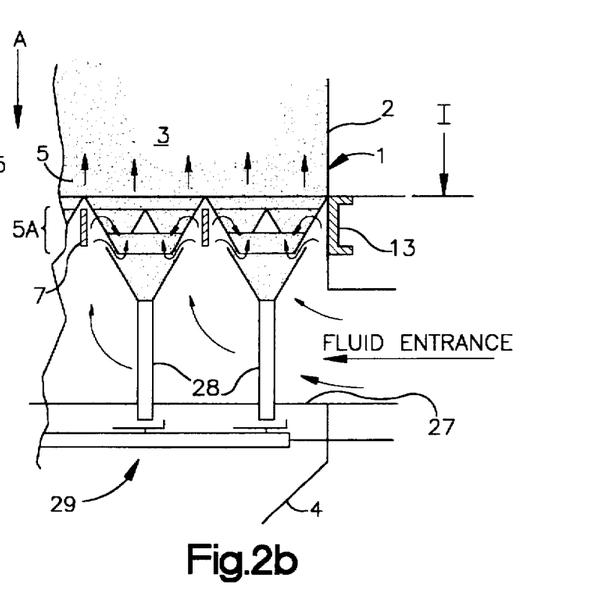

The first loose material drain funnel 9A projects for a distance into the second loose material drain funnel 11A. In this way, the loose material outlet openings 20A of the first loose material drain funnel 9A is arranged lower than the entrance opening 25A of the second loose material drain funnel 11A. In this way, the overlapping of the first and second funnel side walls prevents a piling up of the loose material in this zone. The loose material is drawn off only at the loose material outlet opening 26A of the second loose material drain funnel 11A. Through this loose material drain opening 26A, if desired, a small partial amount of the feed fluid may also flow in. (See FIG. 2(a)). But an inflow of feed fluid through the loose material outlet opening 26A can also be prevented, as shown in FIG. 2(b). In the latter case, a bottom 27 below the fluid entrance is arranged in the moving bed reactor 2, through which are conducted fluid-tight loose material drain pipes 28. In each case, loose material blocking/advancing devices 29 are arranged below the loose material outlet openings 26A.

If needed, vertically arranged loose material separation walls 30 are provided below the distributor elements 18A, and fastened to the side walls 14A of the first loose material drain funnel 9A by welding.

The cross-sectional area not covered by the distribution elements 18A of the first loose material drain funnel 9A forms, about in the zone of the aprons 23, the feed fluid cross-section of each funnel module in the fluid treating region 3. This should be large as possible based on the base dimensional area of each funnel module.

The first contact between the feed fluid and the loose material particles takes place, on the one hand, by the distribution elements 18A and, on the other hand, in the fluid passage gap 24A between the two first and second loose material drain funnels 9A and 11A. The entrance area of the fluid passage gap of a funnel module should preferably be of the same size as the above-mentioned feed fluid cross-section for the fluid treating region. At least, the area ratio should be between 3:1 and 1:3.

As can be seen further from FIG. 4 shown in broken line in the right half of the diagram, the second loose material drain funnel 11A may also be formed in one piece with the first loose material drain funnel 9A. This is a continuation downward below the distribution elements 18A of the first loose material drain funnel 9A. Moreover, other openings 36 may be arranged in the walls of the loose material drain funnel in this zone, and thus in the zone of the second loose material drain funnel. This is shown in broken line in the right half of FIG. 4, and in solid line in the left half. These fluid passage openings may be round, square or elongated in form, and thus also in slot form, for example, using percolating metal. Such openings are always possible if the fluid to be treated is neither loaded with a high freight of particles, nor otherwise might lead to stopping up of the moving bed reactor, especially within the bottom layer 5A of loose material particles (FIG. 2), and thus in the zone of the feed inlet floor itself.

Figure 5:
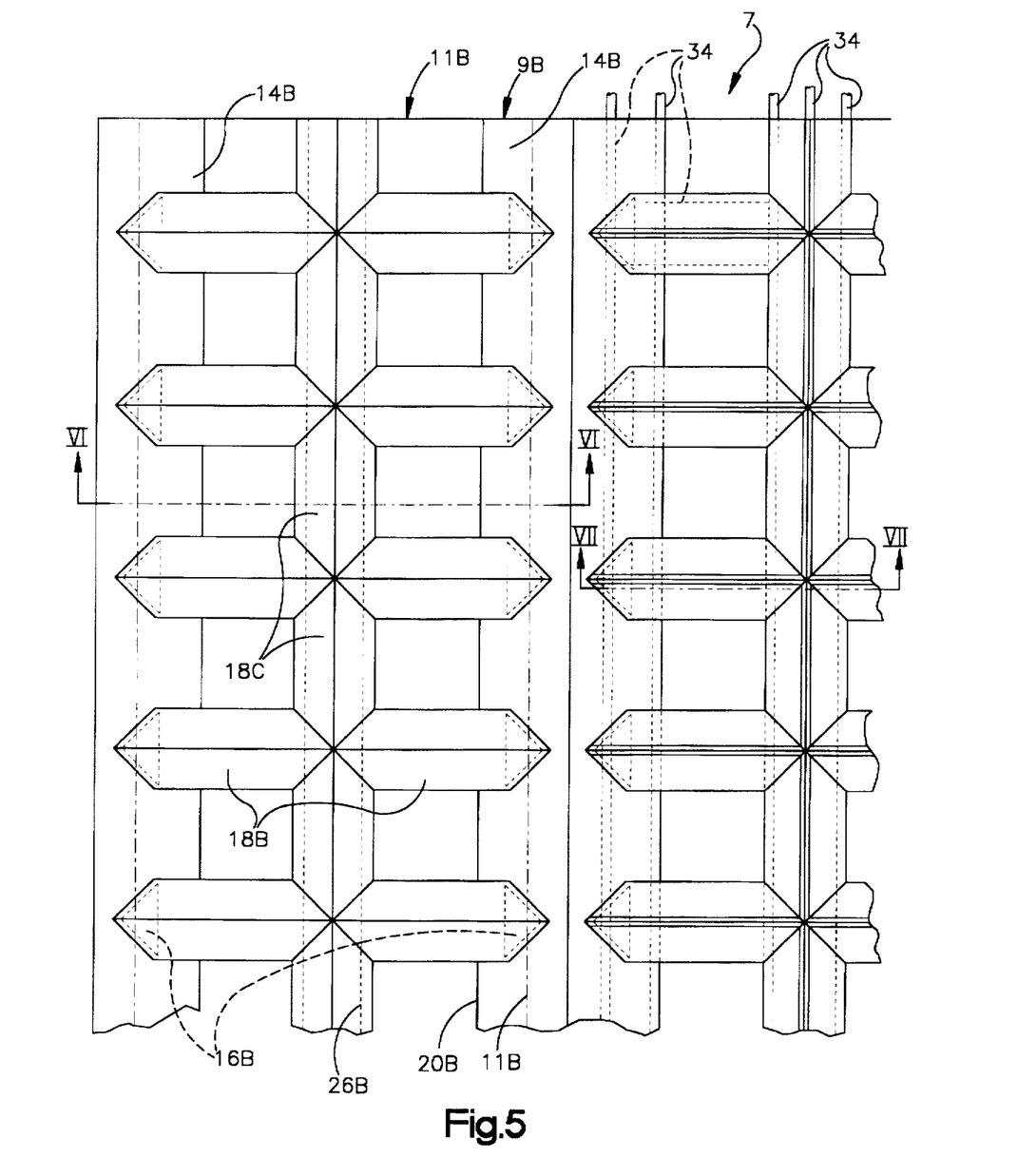
FIG. 5 is an alternative embodiment of a feed inlet floor for the moving bed reactor (channel-shaped feed inlet floor) seen from above (View B in FIG. 6).
Figure 6:
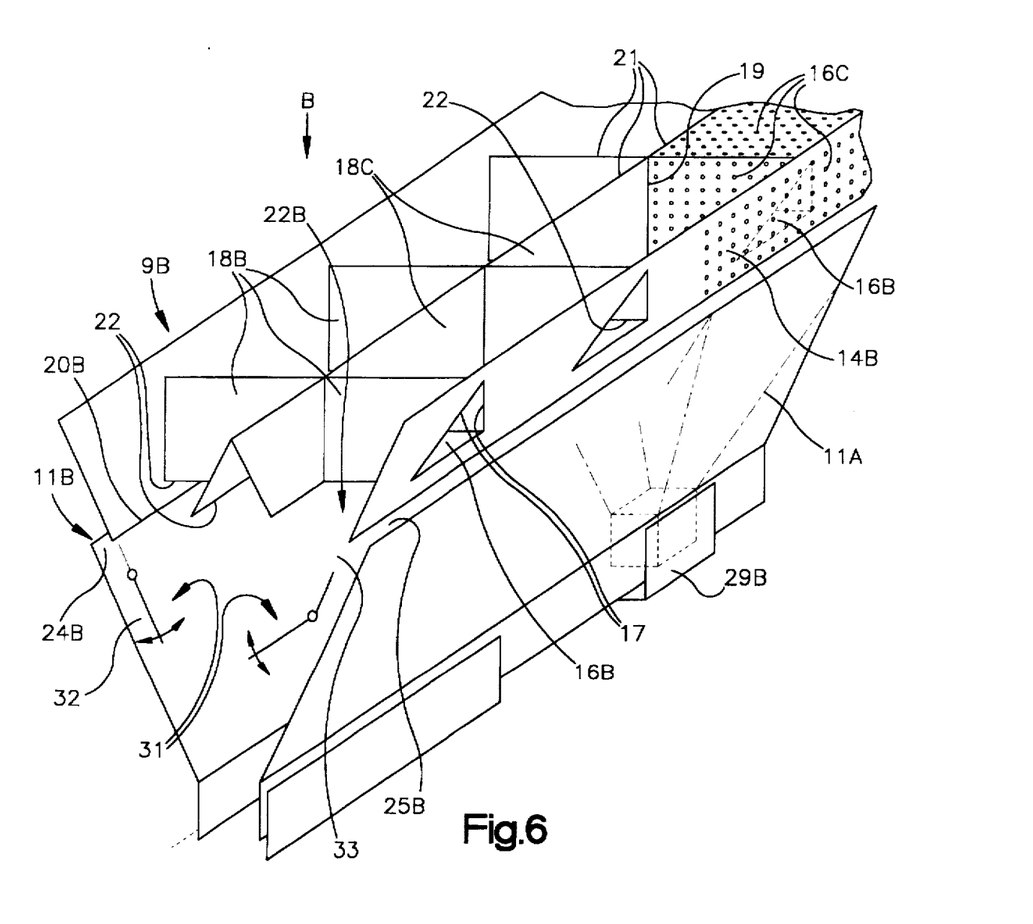
FIG. 6 shows the same feed inlet floor in perspective (vertical section, along the line VI—VI in FIG. 5).

The embodiment in FIGS. 5 and 6 shows a channel-shaped arrangement of the feed in let floor consisting of a first loose material drain channel 9B and a second loose material drain channel 11B. The first loose material drain channel 9B has, corresponding to the examples in FIGS. 1 and 4, side walls 14B running together downward in funnel shape with passage openings 16B provided therein for the fluid to be treated. Side walls 14B of the first loose material drain channel 9B lying opposite each other are connected with each other by roof-shaped distributor elements 18B. Distributor elements 18B neighboring sidewise are joined together in the middle of the channel by another distributor element 16C mechanically and in the sense of fluid distribution and prevention of core flow. The distributor elements 18B and 18C have lower edges 22 which form, with the side walls 14B of each loose material drain channel 9B, loose material passage openings 22B (FIG. 6).

In this embodiment also, a loose material outlet opening 20B of the first loose material drain channel 9B opens to form a fluid passage gap 24B below the entrance opening 25B of the second loose material drain channel 11B, which in turn has a loose material outlet opening 26B which opens below the distributor element 18C into a loose material blocking device 29B. To improve the distribution of fluid in the wind box of the feed inlet floor, second loose material drain funnels 11A may be provided instead of the second loose material drain channel 11B. This is shown in dot and dash line in FIG. 6.

As shown in FIG. 6, loose material conduction surfaces 31 may be arranged within, especially below the cross-section of the loose material outlet opening 20B. Of course, such loose material conduction plates may also be used in the embodiment in FIGS. 1 to 4, but may be made more simply in the channel-shaped embodiment according to FIG. 6. These loose material conduction surfaces 31 may be swingable as a whole (FIG. 6, left half) or in the zone of a partial surface (FIG. 6, right half), and thus more or less narrow the central portion of the loose material channel opening 20B of the first loose material drain channel 9B. The flatter the inclination of the loose material conduction surfaces 31 (in relation to the horizontal), the more the gap 32 formed between the loose material conduction surface 31 and the second loose material drain channel 11A is opened in the direction of the loose material outlet opening 26B of the second loose material drain channel 11B.

The loose material conduction surfaces 31 may, especially if they can swing as a whole, also adjoin directly the first loose material drain channel 9B. This is shown in broken line in the left half of FIG. 6. The increase of the gap 32 downward effects, in each case, a facilitation of the drainage of loose material from the fluid passage gap 24B or from the gap 32 formed at its lower end. An inward swinging in strokes of the loose material conduction surface 31 favors this loose material exchange. The loose material exchange in the zone of the fluid passage gap 25B can also be permanently improved, however, by providing a loose material and fluid passage gap 33 (FIG. 6 right half) between the loose material conduction surface 31 and the loose material outlet opening 20B of the first loose material drain channel 9B. Through this gap, the loose material particles can move out quite easily into the gap 32 between the second loose material drain channel 11B and the loose material conduction surface 31. This particle movement favors the exchange in the zone of the fluid passage gap 24B.

In FIG. 6 are shown, in the extreme right top of the right half beside the dot and dash lines, other alternative embodiments of the invention as to fluid entrance into the fluid treating region, which may of course be realized in other forms. These alternatives concern, on the one hand, the use of perforated plates for the channel side walls 14B (or the funnel side walls 14A in the case of funnel-shaped drain elements) and/or for the roof-shaped distributor elements 18B and/or 18C, (or funnel side walls 18A in the case of funnel-shaped drain elements). Such perforated plates may be used alternatively or, as preferred, in addition to the passage openings 16B, as already explained. The passage opening 16B is shown only in broken line in the upper right zone of FIG. 6 to illustrate the alternative kind of use of various passage openings. The holes of the perforated plates are indicated in general in FIG. 6 as passage openings 16C. The use of perforated plates with passage openings 16C is suitable for reducing the fluid entrance speed in the zone of the feed inlet floor. However, on the other hand, the passage openings 16A or 16B or 16C may be completely omitted, if it is assured in other ways that the feed fluid can enter, at least in the zone of the outlet openings 20A or 20B and in the zone of the lower edges 22, into the fluid treating region. Such a feeding of the feed fluid can take place, for example, by means of pipes 34 with feed openings 35, such as those described with reference to FIG. 7 below in connection with use for additional fluids.

The construction parts according to the invention may be combined with each other to a great extent within the frame of the invention, which is true also of the various possibilities according to the invention for operating a moving bed reactor according to the invention.

Figure 7:
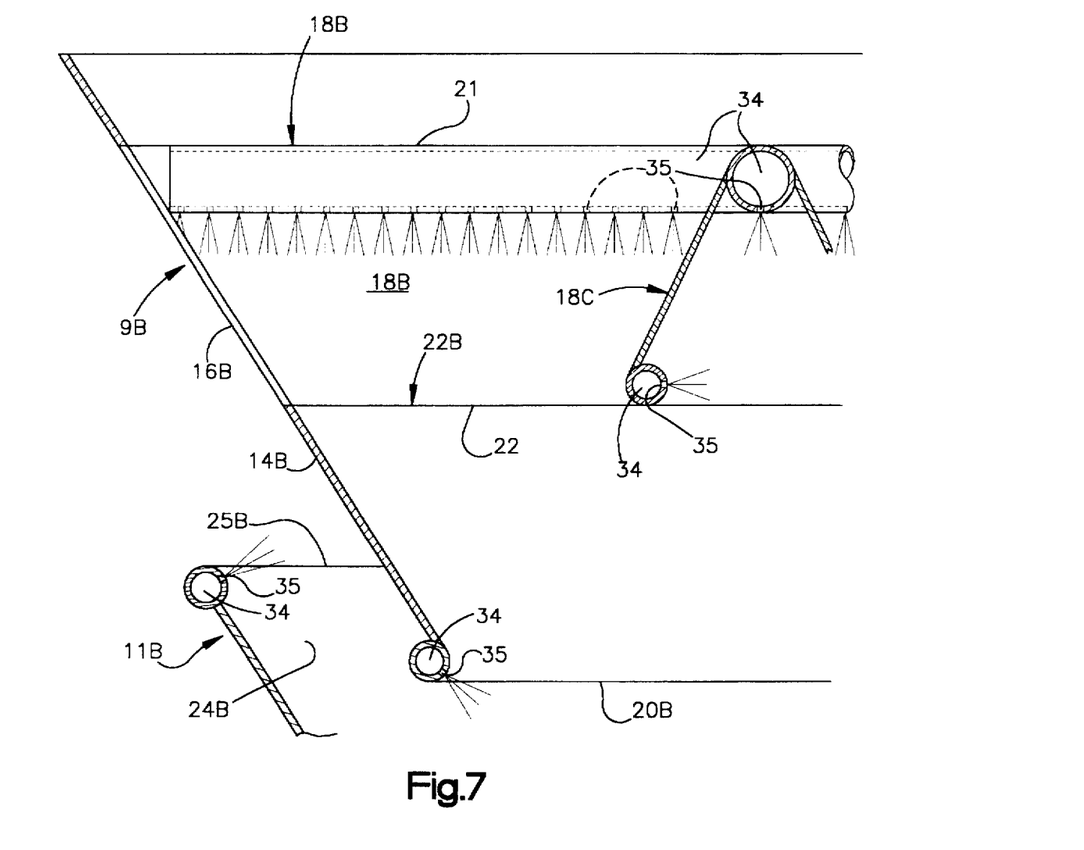
FIG. 7 shows another alternative embodiment of a feed inlet floor for a moving bed reactor, with an additional device for a treating medium.

From FIG. 7 as well as FIG. 5 (right half), it is shown that at various points of the feel inlet floor 1, pipes 34 or similar distributor elements for treating media or the like may be arranged which are provided with feed openings 35 through which such a treating medium can be fed to the fluid to be treated just before its entrance into the loose material. In this way, for example, $NH_3$ may be mixed with a firing fume gas loaded with $NO_x$ and possibly $SO_x$ also, as described hereinabove.

Such pipes advantageously stiffen and reinforce the feed inlet floor 1, and provide rounded and thus favorable cross-sections at the edge zone where they are preferably arranged. Preferably, these pipes 34 are arranged in the zone of the ridges 21 and the lower edges 22 of the continuous distributor elements 18C, and also in the zone especially of the ridges of the distributor elements 18B (or 18A). Also recommended is the arrangement of such pipes 34 in the zone of the outlet opening of the first drain funnel (or channel)

and in the zone of the entrance openings of the second drain funnel (or channel). Such pipes 34 (as shown in FIG. 7, left, above) may also have dead ends. The feed openings 35 are preferably so arranged that they do not lie in the loose material or, at least, cannot be directly blocked by loose material.

Such a feed inlet floor is also suitable, for example, for use in a moving bed reactor with several steps in which several feed inlet floors according to the invention are arranged one above the other, and in which the outlet openings of the higher feed inlet floor in each case, or the pipes or shafts set at these outlet openings, serve as loose material feed elements for the partial bed of the moving bed reactor. The loose material moves through all the partial beds, then downward from above. Also, the feed fluid can flow through these partial beds upward from below. But each partial bed may also be flowed through by a separate feed fluid. For this purpose, it is necessary then to lead the loose material feed elements through a closed intermediate floor of the moving bed reactor and below these intermediate floors. The wind box under the feed inlet floor, the fluid outflow chambers above the partial beds, and the mutual coordination of the loose material feed elements with the loose material drain openings of the partial beds lying below may be provided similarly as in WO 87/00768.

Having described preferred embodiments of the invention, I claim:

1. A floor for a moving bed reactor for treating a fluid with moving granular material comprising
   1) at least one first drain channel for granular material, said first drain channel comprising a top, a bottom and walls between the top and bottom defining a funnel which narrows in cross-sectional area from said top to said bottom, said walls including opposed wall portions;
   2) at least one fluid distributor element within said first drain channel dividing said first drain channel into at least two sectors, said fluid distributor element being connected to and projecting from at least one of said channel opposed wall portions, and comprising surfaces sloping downwardly and defining an elongated inverted trough, the lower edges of said fluid distributor element defining with said first drain channel granular material discharge openings for said at least two sectors; and
   3) opening means in said at least one drain channel opposed wall portion in fluid communication with said fluid distributor element, said opening means and fluid distributor element defining a first flow passageway for the distribution of fluid into said at least two sectors at said drain channel discharge openings.

2. The floor of claim 1 comprising at least two distributor elements within said first drain channel each connected to drain channel opposed wall portions, said distributor elements extending at an angle to each other across the drain channel and intersecting at a point of intersection in the middle of the drain channel, said first drain channel bottom defining a granular material outlet beneath said point of intersection.

3. The floor of claim 2 wherein said distributor elements extend at right angles to each other.

4. The floor of claim 1 wherein said first drain channel bottom defines an outlet opening for granular material, movable downwardly in said drain channel, said distributor element being above said outlet opening and comprising lower edges in a narrowed portion of said drain channel.

5. The floor of claim 4 wherein said distributor element comprises vertically oriented aprons appended to the lower edges of said downwardly sloping surfaces of the distributor element, and the bed of downwardly moving particles beneath said distributor element is in the shape of a valley.

6. The floor of claim 1 comprising a second drain channel comprising walls defining a funnel which narrows in cross-sectional area from top to bottom, said second drain channel being below said first drain channel and coaxial with said first drain channel, said second drain channel top overlapping but being spaced from said first drain channel bottom and defining, with said first drain channel bottom, a second flow passageway for the distribution of fluid into said first drain channel.

7. The floor of claim 1 comprising an elongated, vertically oriented separation wall below said distributor element aligned with the alignment of the distributor element.

8. The floor of claim 6 comprising granular material deflectors within said second drain channel to deflect the downward flow of granular material from said first drain channel.

9. The floor of claim 8 wherein said material deflectors are spaced inwardly from said second drain channel walls.

10. The floor of claim 9 wherein said material deflectors are movable in an up or down direction.

11. The floor of claim 10 wherein said material deflectors constrict said first drain channel granular material outlet.

12. The floor of claim 3 comprising multiple side-by-side first drain channels in which each first drain channel has four walls and a rectangular cross sectional area in a horizontal plane, and said distributor elements extend between opposed walls of said drain channel.

13. The floor of claim 12 in which each first drain channel has a square cross-sectional area in a horizontal plane.

14. The floor of claim 12 in which each first drain channel has a width direction and a length direction greater than the width direction, and the floor comprises at least two distributor elements extending widthwise in the drain channel and spaced apart from each other lengthwise in the channel.

15. The floor of claim 6 comprising spray means contiguous with said first or second flow passageways for treating said fluid with a treating medium.

16. The floor of claim 15 wherein said spray means are appended to the lower edges of the downwardly sloping surfaces of the distributor element, to the bottom of the walls of said first drain channel, and to the top of the walls of said second drain channel.

17. The floor of claim 1 wherein said first drain channel and said distributor element comprise perforations for the flow of fluid therethrough.

18. A floor for a moving bed reactor for treating a fluid with granular material comprising:
   1) at least one drain channel for said granular material, said drain channel comprising a top, a bottom, and walls between the top and bottom defining a vertically oriented funnel having a horizontal cross-sectional area which narrows from said top to said bottom;
   2) an open granular material outlet at said bottom of said drain channel;
   3) at least two elongated fluid distributor elements within said drain channel each comprising downwardly sloping surfaces defining an elongated inverted trough, said distributor elements being appended to the drain channel walls and extending across the drain channel at an angle with respect to each other intersecting at a point above said granular material outlet, said distributor elements dividing the cross-sectional area of the drain channel into multiple sectors and covering at least most of said granular material outlet; and 4) means for introducing said fluid into said fluid distributor elements for flow into the bottom of each of said multiple sectors.

19. The floor of claim 18 wherein said one drain channel comprises openings in the walls of the drain channel in communication with said distributor elements and defines, with said distributor elements, first flow passageways for the distribution of fluid into said one drain channel.

20. The floor of claim 19 comprising a second drain channel comprising walls defining a funnel which narrows in cross-sectional area from top to bottom, said second drain channel being below said first drain channel and coaxial with said first drain channel, said second drain channel top overlapping but being spaced from said first drain channel bottom and defining, with said first drain channel bottom, a second flow passageway for the distribution of fluid into said first drain channel, further comprising granular material deflectors within said second drain channel to deflect the downward flow of granular material flowing from said first drain channel.

21. The floor of claim 20 wherein said material deflectors are spaced inwardly from said second drain channel walls.

22. The floor of claim 20 wherein said material deflectors are movable in an up or down direction.

23. The floor of claim 21 wherein said material deflectors constrict said first drain channel granular material outlet.

* * * * *